UNITED STATES PATENT OFFICE.

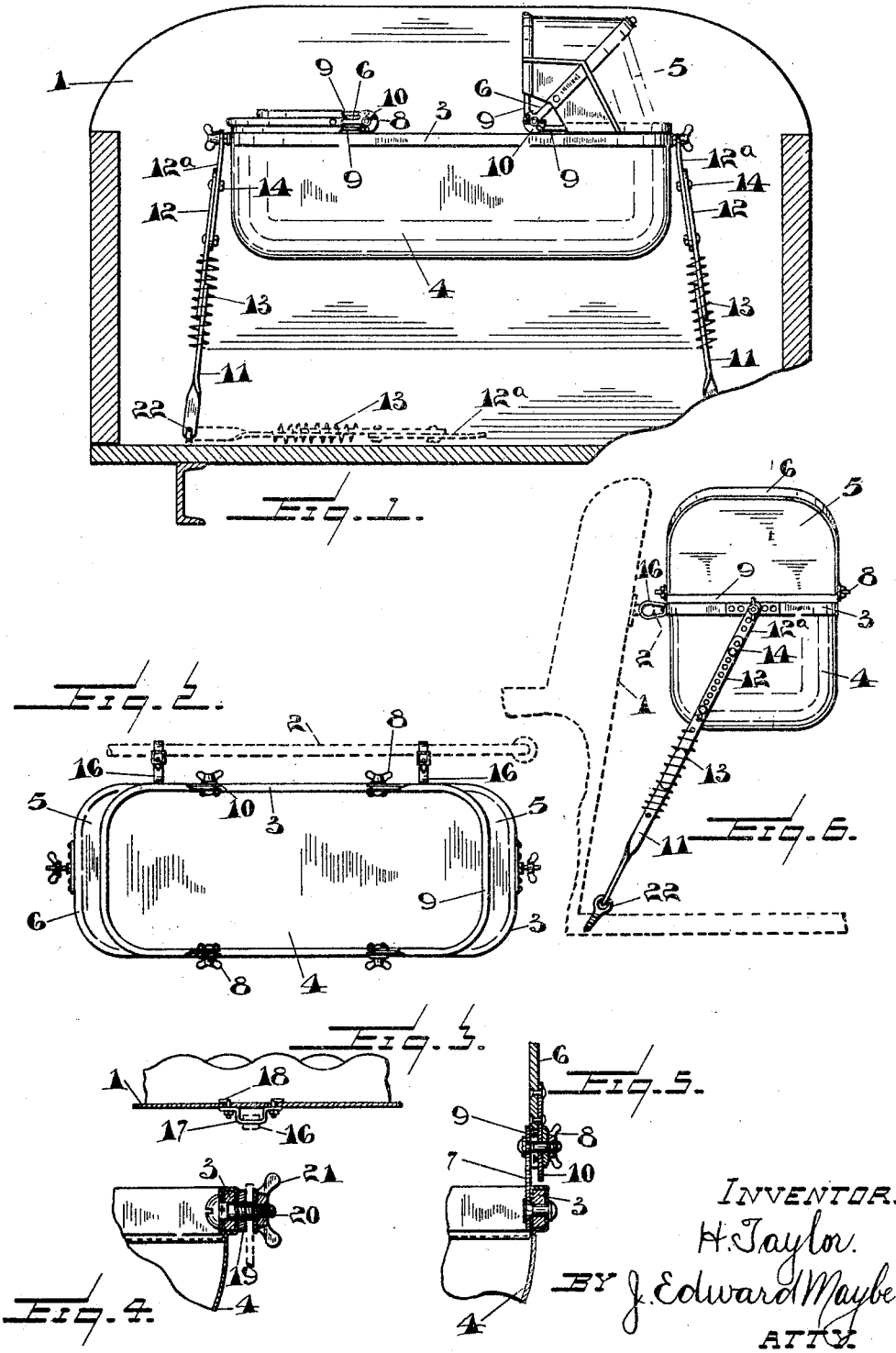

HERBERT TAYLOR, OF HAMILTON, ONTARIO, CANADA, ASSIGNOR OF ONE-HALF TO THOMAS H. BARNARD, OF HAMILTON, ONTARIO, CANADA.

CRIB ATTACHMENT FOR MOTOR-CARS AND THE LIKE.

1,377,607.   Specification of Letters Patent.   Patented May 10, 1921.

Application filed August 4, 1919. Serial No. 315,132.

*To all whom it may concern:*

Be it known that I, HERBERT TAYLOR, of the city of Hamilton, in the county of Wentworth, Province of Ontario, Canada, have invented certain new and useful Improvements in Crib Attachments for Motor-Cars and the Like, of which the following is a specification.

My object in the present invention is to devise a child's crib which when in use may be supported partly from the car floor and partly from the back of the front seat of a motor car and which when not in use may be folded flat and, its floor supports having been disconnected, stored away or left hanging from the robe rail or other convenient support.

I attain my object by means of the constructions hereinafter described and illustrated in the accompanying drawings in which—

Figure 1 is a rear view of the front seat of a motor car with my crib attachment in position for use;

Fig. 2 a rear view showing the device folded and hanging from the robe rail of a motor car;

Fig. 3 a sectional plan view showing the method of attaching a loop to the seat back to which the attaching straps of the crib may be connected; and Fig. 4 a sectional detail of the connection between one of the floor supports and the rim of the crib; and Fig. 5 a sectional detail of one of the connections between the hood frame and the rim of the crib;

Fig. 6 is a side elevation of the crib attachment attached to the front seat of a motor car in position for use.

In the drawings like numerals of reference indicate corresponding parts in the different figures.

1 represents the back of the front seat of the motor car and 2 the robe rail secured thereto. The crib is formed of a rigid rim 3 and a flexible crib body 4 secured to the rim. To the rim are secured protecting hoods, preferably one at each end of the crib. Each hood comprises a hood frame formed of pivotally connected bows and a hood cover 5 of flexible material suitably secured to the bows. The hood frame comprises a center bow 6 having enlarged ends pivoted to lugs 7 secured to the rim of the crib. Preferably the pivot is formed by a clamping screw 8 passing through the end 10 and the lug 7 so that the bow may be held at any desired angle to the rim of the crib. The outer bows 9 are independently pivotally connected to the enlarged ends 10 of the center bow between them and the lug 7, so that these bows may be set at any desired angle to the center bow and clamped by the tightening of the clamping screw 8. From the construction as described it follows that the hoods may be set up in any position either partly or wholly open, or may be folded down flat as indicated in Fig. 2 when the device is not in use.

The crib is supported by the straps and buckles 16 from the robe rail of the car and by supports which are pivotally connected with the ends of the rigid rim and preferably also with the floor by means of screw eyes 22 passing through holes in the ends of the supports. Each support is formed of at least two parts 11 and 12, which overlap one another and are respectively secured to the ends of a coil spring 13 embracing the parts and therefore serving as a guide to keep them in substantial alinement.

For purposes of adjustment the part 12 of each hanger is also divided, the upper part being numbered 12ª. The parts 12 and 12ª are provided with a plurality of bolt holes so that by means of bolts 14 the parts may be secured together in different positions to shorten or lengthen the hangers as may be necessary. In cases where the car is not equipped with a robe rail are provided special loops 17 such as shown in Fig. 3. Each loop is secured in place by hook-shaped bolts 18, the ends of which may be passed through holes formed in the seat back, their outer ends passing through the loop 17 being secured in position by suitable nuts.

The ends of the supports are preferably detachably pivoted to the rim of the crib and the pivotal connections are so arranged that the crib rim may turn freely on the supports and not be rigidly clamped thereto. To provide for this the pivots 19 are formed of bolts suitably secured to the rim and having the outer parts 20 of reduced diameter on which screw the wing nuts 21. The nuts therefore cannot be screwed up so tightly as to clamp the hanger ends. When the device is not in use the supports are disconnected from the crib rim and turned down on the car floor, the hoods folded flat and the crib body collapsed. The crib can then be left hanging on the straps 16 on the robe rail or the equivalent supports as shown in Fig. 2.

What I claim as my invention is:

1. A crib attachment for motor cars and the like comprising a rigid rim; a flexible crib body connected to the rim; means for connecting one side of the rim to the motor car so that the rim may be swung up or down; eye bolts secured to the floor; supports provided with holes engaging said eye bolts and pivotally and detachably connected to the ends of the rim intermediate the sides, each support comprising two flat bars slidable longitudinally on one another, and a coil spring embracing the bars and with the ends of which the bars are respectively connected.

2. A crib attachment for motor cars and the like comprising a rigid rim; a flexible crib body connected to the rim; means for connecting one side of the rim to the motor car so that the rim may be swung up or down; supports pivotally connected to the floor to swing in any direction, each support comprising two flat bars slidable longitudinally on one another; bolts provided on the ends of the rim intermediate the sides on which said supports are pivoted each bolt being provided with a threaded projection of smaller diameter to engage a nut so that the latter cannot jam said support; and a coil spring embracing the bars and with the ends of which the bars are respectively connected.

3. A crib attachment for motor cars and the like comprising a rigid rim; a flexible crib body connected to the rim; means for connecting one side of the rim to the motor car so that the rim may be swung up or down; eyebolts secured to the floor; supports provided with holes engaging said eye bolts; each support comprising two flat bars slidable longitudinally on one another; bolts provided on the ends of the rim intermediate the sides on which said supports are pivoted, each bolt being provided with a threaded projection of smaller diameter to engage a nut so that the latter cannot jam said support; and a coil spring embracing the bars and with the ends of which the bars are respectively connected.

Signed at Hamilton, Canada, this 15th day of July, 1919.

HERBERT TAYLOR.

Witnesses:
 MARGARET HARRISON,
 ISOBEL FEATHERSTONE.